_United States Patent Office_

2,970,981
Patented Feb. 7, 1961

2,970,981

VINYL CHLORIDE RESINS COMPRISING A STABILIZING AMOUNT OF A PHOSPHINE

Gerry P. Mack, Jackson Heights, N.Y., assignor, by mesne assignments, to Metal & Thermit Corporation, Rahway, N.J., a corporation of New Jersey No Drawing. Filed Apr. 10, 1958, Ser. No. 727,548

9 Claims. (Cl. 260—45.75)

The present invention relates to improved halogen-containing resins.

During the forming of resins into plastic sheets, rigid bodies, etc., the materials are worked at high temperatures. High temperature working of the material facilitates the forming operation and decreases the time during which hot working is needed, increasing capacity of the equipment. When worked at high temperatures resins deteriorate rapidly. This is evidenced first by a yellowing and then a progressive darkening of the material; the initially colorless transparent stock turning, in stages, yellow, tan, and then brown, black and opaque.

I have now discovered a stabilizer which when incorporated in halogen-containing resins improves the stability of the resin.

It is an object of the present invention to provide stabilized halogen-containing resins.

The invention also contemplates providing resin compositions composed of mutually compatible materials that are stabilized against the deteriorative effects of heat and light.

Another object of this invention is to provide halogen-containing resins stabilized by non-volatile additives.

The invention also contemplates providing halogen-containing resin compositions of superior stability, prepared by the addition to the resin of a phosphine in conjunction with other stabilizers.

Other objects and advantages will become apparent from the following description.

Generally speaking, the present invention provides stabilized halogen-containing resins prepared by incorporating in the resin formulation a small but effective amount of chlorophosphine having the general formula:

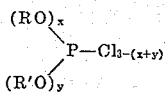

wherein $x$ and $y$ may each be 0 or 1, and $x$ plus $y$ equals 1 or 2. R and R' are selected from the class consisting of aliphatic, cycloaliphatic, and aromatic groups. The individual R and R' groups may be cyclized, fused or condensed with other R groups and may be substituted with radicals, elements or groups not deleterious to the functions of the chlorophosphine compounds in service, such as chlorine, alkoxy, aryloxy, etc. Preferred R and R' groups for the use in these phosphines are aliphatic and cycloaliphatic groups having not more than 18 carbon atoms in each group, phenyl groups, and alkyl substituted phenyl groups having not more than 12 carbon atoms in the substituting group. Especially preferred R and R' groups are those selected from the class consisting of octyl, phenyl, octylphenyl and nonylphenyl.

The chlorophosphines of this invention may be prepared by reacting one part of a phosphorus trihalide with up to two parts of an organic alcohol or phenol of the general formula ROH. The reaction may be carried out in an inert solvent if desired. Due to the non-stoichiometric proportions of reactants sometimes used, gross mixtures of various mono- and di-chlorophosphines and particularly mixtures of impure materials may have gross chlorine contents that deviate markedly from the theoretical chlorine content of the mono- and di-chlorophosphines.

The preparation of illustrative chlorophosphines used in the compositions of the present invention are described below.

EXAMPLE 1

_Chlorodi(nonylphenoxy)phosphine_

To 0.5 mole of phosphorus trichloride dissolved in 15 ml. of toluene is added 1.0 mole of nonylphenol. After the addition is complete, the reaction mixture is stirred under a vacuum and the product purified. The crude material can be directly used in the compositions of this invention.

EXAMPLE 2

_Chlorodi(octyloxy)phosphine_

To 0.5 mole of phosphorus trichloride is added 1.0 mole of octyl alcohol with stirring and the stirring continued. The reaction temperature at the end of the stirring is maintained at 60° C. for 1 hour. Then the flask is maintained under vacuum for several hours while stirring is continued. The product is directly usable in the compositions.

EXAMPLE 3

_Dichloro(octylphenoxy)phosphine_

This product is prepared from 1 mole of phosphorus trichloride and 1 mole of octylphenol by the process described in Example 2.

EXAMPLE 4

_Chloro(octylphenoxy)-2-chloroethoxyphosphine_

This product is prepared by the adding to 1 mole of dichloro octylphenoxyphosphine (prepared as described in Example 3) 1 mole of ethylene oxide. The crude product is directly usable in the compositions of this invention.

Examples of the chlorophosphine materials used in this invention are:

chlorodi(nonylphenoxy)phosphine,
chlorodi(octylphenoxy)phosphine,
chlorodi(decylphenoxy)phosphine,
chlorodi(dodecylphenoxy)phosphine,
chlorodi(octadecylphenoxy)phosphine,
chlorodi(tert-amyl)phosphine,
chlorodi(hexyloxy)phosphine,
chlorodi(octyloxy)phosphine,
chlorodi(oleyloxy)phosphine,
chlorodi(nonylphenoxy)phosphine,
chlorodi(octylphenoxy)phosphine,
dichloro(nonyloxy)phosphine,
dichloro(octyloxy)phosphine,
dichloro(oleyloxy)phosphine,
chloro(octyloxy)(octylphenoxy)phosphine,
chloro(nonylphenoxy)(octylphenoxy)phosphine,
chloro(octylphenoxy)(oleyloxy)phosphine,
2-chloroethylchlorophosphine,
chloro(octyloxy)(2-chloropropoxy)phosphine,
chloro(decyloxy)(2-chloropropoxy)phosphine,
chloro(octylphenoxy)(2-chloropropoxy)phosphine,
chloro(oleyloxy)(2-chloroethoxy)phosphine.

Additional illustrative types of phosphine compounds used in this invention are: the reaction product of 1 mole of dichloro(nonylphenoxy)phosphine and 1 mole of epoxidized glyceryl monooleate, the reaction product of 1 mole of dichloro(octylphenoxy)phosphine and 1 mole of epoxidized glyceryl monoricinoleate, the reaction product of 1 mole of dichloro(octyloxy)phosphine and 1 mole of butyl epoxystearate, the reaction product of 1 mole of dichloro(octylphenoxy)phosphine and 1 mole of nonylphenyl glycidyl ether, and the reaction product of 1 mole of dichloro(nonylphenoxy)phosphine and 1 mole of tetrahydrofurfuryl epoxystearate.

Many materials have been found to be effective stabilizers in that they retard, in some degree, the deteriorative effects of heat and/or light. To be suitable for commercial use, the stabilizers must be compatible in the resin, must have a minimum of plate-out during milling, and must retard the deteriorative effects of heat and/or light. This last property is usually determined by examination of the color and clarity of resins tested after subjection to high temperatures. The most desirable stabilized resins are those that are initially clear and transparent and retain this condition for the longest period of time. The onset of a distinct yellow cast to a transparent stabilized resin is an indication of the limit of usefulness of the resin. The stabilizers of the present invention are particularly effective in this respect. Resins formulated with these stabilizers do not show effects of yellowing for long periods of time. This permits the formulation and manufacturing of halogen resins which contain the stabilizers of this invention at more elevated temperatures. The stabilizers of this invention also render halogen-containing resins resistant to heat deterioration on storage and usage afterwards.

As used herein, the term "parts" or "part" indicate parts by weight, unless otherwise specified.

In Examples 5 to 11 below, polyvinyl chloride resin formulations containing the stabilizer compositions of the invention were prepared by milling the base resin formulation and stabilizer components together for 5 minutes on a 2-roll differential speed mill, at 320° F. The resin, having the stabilizer incorporated therein, was removed as a pressed sheet and cut into strips for testing. For comparison purposes, the base resin formulation without stabilizer was similarly processed. To test the heat stability of the strips with and without the stabilizers, samples of each were placed for 45 minutes in a circulating air oven maintained at 350° F. and then removed. The samples were inspected and rated as to their color.

EXAMPLE 5

A stabilized test strip is obtained by milling 0.5 part of chlorodi(octylphenoxy)phosphine stabilizer into 100 parts of vinyl chloride polymer as described above. After 45 minutes in the oven, the stabilized resin test strip has a light yellow appearance while the unstabilized resin test strip appears brown.

EXAMPLE 6

To 100 parts of vinyl chloride polymer is added 0.5 part of dichloro(octyloxy)phosphine by the milling process described above. The appearance of the stabilized test sample is a light yellow after a 45 minute heating period as compared to a brown appearance of a test strip of the nonstabilized vinyl chloride polymer similarly treated.

EXAMPLE 7

Chlorodi(octyloxy)phosphine (0.5 part) is added to 100 parts polyvinyl chloride by the milling process described above. Upon the completion of the heat test, the stablized resin test strip has a light yellow appearance whereas the unstabilized resin test strip is brown.

EXAMPLE 8

Chloro(nonylphenoxy)(octylphenoxy)phosphine (0.5 part) is milled into 100 parts of polyvinyl chloride as described above. The stabilized resin test strip has a light yellow appearance at the end of the heating period whereas the unstabilized resin has a brown appearance.

EXAMPLE 9

Polyvinyl chloride (100 parts) is stabilized as described above with 0.5 part of the reaction product prepared from 1 mole of dichloro(octyloxy)phosphine and 1 mole of butyl epoxystearate. After the heat treatment, the stabilized resin test strip has a colorless appearance as compared to a brown appearance of the unstabilized resin test strip.

EXAMPLE 10

Polyvinyl chloride resin (100 parts) is stabilized as described above by 0.5 part of the reaction product formed from 1 mole of dichloro(octylphenoxy)phosphine with 1 mole of epoxidized glyceryl monoricinoleate. A test strip of this stabilized resin has a light yellow appearance after heat exposure as compared to a brown appearance of a similarly exposed unstabilized resin test strip.

EXAMPLE 11

Polyvinyl chloride resin (100 parts) is stabilized as described above with 0.5 part of the reaction product formed from 1 mole of dichloro(nonylphenoxy)phosphine and 1 mole of epoxidized glyceryl monooleate. After heat exposure, the stabilized resin test strip appeared colorless while the unstabilized test strip appeared brown.

The color of the polyvinyl resin stabilized by the compounds of this invention shown in Examples 5 to 11 is essentially unchanged by the heat treatment. However, in the case of the nonstabilized polyvinyl chloride, the color is in all cases change by the heat treatment to brown. The stabilizing compositions can be used from about 0.5 part to about 5 parts per 100 parts of the halogen-containing resin. Preferably about 1 to 3 parts per 100 parts of halogen-containing resins are used.

The chlorophosphine compounds of this invention are advantageously used in conjunction with other stabilizers, e.g., metallic salts of organic acids, metallic phenolates, diorganotin salts of organic acids, etc., to yield resins having superior stability. Preferred polyvalent metal salts of organic acids include the salts of cadmium, zinc, lead, tin, barium, strontium, and calcium. Some preferred examples of these salts are cadmium benzoate, cadmium di(t-butylbenzoate), barium laurate, calcium laurate, and mixtures thereof. The phenolate metal salts include those of cadmium, zinc, lead, tin, barium, strontium, and calcium. Illustrative examples of the phenolates which may be employed in conjunction with the compounds of this invention are nonylphenol, oleylphenol, and laurylphenol salts. Some preferred phenolates are barium phenolates containing straight chain alkyl substituents having 6 to 13 carbon atoms on the phenyl ring; especially preferred are barium octylphenolate and barium nonylphenolate. The organotin stabilizers which may be used in conjunction with the compounds of this invention include the diorganotin salts of organic acids, diorganotin derivatives of mercapto compounds, as for example, mercaptoacid esters and mercaptains. Some preferred examples of the tin stabilizers include dibutyltin-S,S'-bis-isooctyl mercaptoacetate and dibutyltin-S,S'-bis-laurylmercaptide.

Examples 12 to 14 further illustrate the ultilization of the chlorophosphine stabilizers of the present invention in conjunction with prior art stabilizers.

EXAMPLE 12

A base resin formulation comprising 100 parts of polyvinyl chloride resin, 50 parts of dioctylphthalate and 2 parts of a mixture prepared from barium laurate and cadmium laurate (2:1) is prepared. To this base formulation is added 0.5 part of chlorodi(octylphenoxy)phosphine by milling the mixture for 5 minutes on a 2-roll differential speed mill at 320° F. A strip is prepared and tested for heat stability by placing it in a circulating air oven maintained at 300° F. for 45 minutes. At the end of this time, the test strip is essentially clear in appearance. A nonstabilized strip has a brown appearance after this heat treatment.

EXAMPLE 13

Polyvinyl chloride resin (100 parts) is stabilized by milling into it, as described in Example 12, 0.6 part of barium di(nonylphenolate) and 0.3 part of cadmium di(p-tert-butylbenzoate) and 0.5 part of the reaction product formed from 1 mole of dichloro(octylphenoxy)phosphine with 1 mole of nonylphenyl glycidyl ether. A test strip maintained at 350° F. for 45 minutes has an essentially clear appearance. A nonstabilized strip has a brown appearance after the heat treatment.

EXAMPLE 14

Polyvinyl chloride resin is stabilized by milling into it 3 parts of dibutyltin-S,S'-bis-isooctyl mercaptoacetate and 0.5 part of chlorodi(octylphenoxy)phosphine (as described in Example 12). The stabilized resin is tested for 45 minutes at 350° F. as described in Example 12. It is found that the stabilized resin has an essentially clear appearance whereas an unstabilized sample has a brown appearance.

Examples 15 and 16 illustrate the stabilizing properties of the compounds used in this invention in plasticized halogen-containing resins.

EXAMPLE 15

Two samples comprising 100 parts of a vinyl chloride-acetate copolymer (95% chlorine) are dry blended with 30 parts of dioctyl phthalate. The first sample is stabilized with 0.5 part of the reaction product formed from 1 mole of dichloro(octylphenoxy)phosphine and 1 mole of butyl epoxystearate per 100 parts of said copolymer. Each of the samples is then worked on a rubber mill at about 300° F. for 40 minutes. The first sample, which includes the barium-cadmium stabilizer, has a very pale yellow tint, whereas the second sample (unstabilized) is a dark yellow.

EXAMPLE 16

Two samples comprising 100 parts of a vinyl chloride-dibutyl maleate copolymer are dry blended with 35 parts of dibutyl sebacate. The first sample is stabilized as specified in Example 15 and both samples worked as specified in Example 15 with similar results.

Generally speaking, the halogen-containing resins, which are rendered heat and light resistant by the stabilizers of this invention, are polymers of vinyl chloride and vinyl resins containing vinyl chloride units in their structure, such as copolymers of vinyl chloride with vinyl esters of aliphatic carboxylic acids, particularly vinyl acetate, copolymers of vinyl chloride with esters, nitriles and amides of unsaturated carboxylic acids, e.g., of acrylic and methacrylic acid, copolymers of vinyl chloride with diene compounds and with unsaturated dicarboxylic acids or their anhydrides, such as copolymers of vinyl chloride with diethyl maleate, diethyl fumarate or maleic anhydride, after-chlorinated polymers and copolymers of vinyl chloride, polymers of vinylidene chloride and copolymers of the same with vinyl chloride and other polymerizable compounds; polymers of vinyl chloroacetate and di-chlorodivinyl ether; chlorinated polymers of vinyl acetate, chlorinated polymeric esters of acrylic and alpha-substituted acrylic acids; polymers of chlorinated styrenes, for instance, dichlorostyrene; chlorinated rubber, chlorinated polymers of ethylene, polymers and after-chlorinated polymers of chlorobutadiene, and their copolymers with vinyl chloride; rubber hydrochloride and chlorinated rubber hydrochloride; and mixtures of the polymers recited herein with each other polymerizable compounds.

The stabilizers of the present invention are also effective stabilizers for organosols and plastisols. Plasticizers commonly used in plasticized resins, organosols and plastisols include esters of the following acids; phthalic acid, adipic acid, sebacic acid, azelaic acid, citric acid, aconitic acid, tricarboxylic acid, maleic, fumaric, succinic, phosphoric acid, and mercapto acids like thioglycolic acids and the like; esters of dihydric and polyhydric alcohols, such as glycol, glycerol, pentaerythritol, sorbitol and the like; esters of thioglycols and other sulfur-containing derivatives; amino alcohol derivatives; ester amides, sulfonamides and other amides, chlorinated plasticizers, and carbonic acid derivatives derived from phosgene.

The stabilizers of this invention are useful with halogen-containing resins having other stabilizers, ultraviolet absorbers and plasticizers.

While the invention has been described with particular reference to specific embodiments, it is to be understood that it is not limited thereto but is to be construed broadly and is to be restricted solely by the scope of the appended claims.

I claim:

1. A vinyl chloride resin stabilized against discoloration, by incorporating therein a phosphine having the general formula

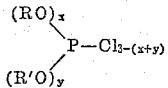

wherein $x$ and $y$ are numbers from 0 to 1; $x$ plus $y$ equals 1 to 2; and wherein R and R' are selected from the class consisting of aliphatic, cycloaliphatic and aromatic groups.

2. A composition as defined in claim 1 in which the resin is a vinyl chloride copolymer.

3. A composition as defined in claim 1 in which the resin is polyvinyl chloride.

4. A stabilized composition as defined in claim 1 in which there is added a secondary polyvinyl chloride stabilizer selected from the class consisting of polyvalent metal salts of organic carboxylic acids, polyvalent metal phenolates and tetravalent organotin compounds.

5. A composition as defined in claim 4 in which the resin is a vinyl chloride copolymer.

6. A composition as defined in claim 4 in which the resin is polyvinyl chloride.

7. A composition as defined in claim 1 in which the phosphine is chlorodi(nonylphenoxy)phosphine.

8. A composition as defined in claim 1 in which the phosphine is chlorodi(octylphenoxy)phosphine.

9. A composition according to claim 1 wherein the amount of phosphine is between about 1 and about 3 parts by weight per 100 parts of resin.

References Cited in the file of this patent

UNITED STATES PATENTS

| | | |
|---|---|---|
| 2,716,092 | Leistner et al. | Aug. 23, 1955 |
| 2,752,319 | Lipke et al. | June 26, 1956 |